Dec. 30, 1952     F. A. KROHM     2,623,232
WINDSHIELD WIPER APPARATUS
Filed May 15, 1946     2 SHEETS—SHEET 1
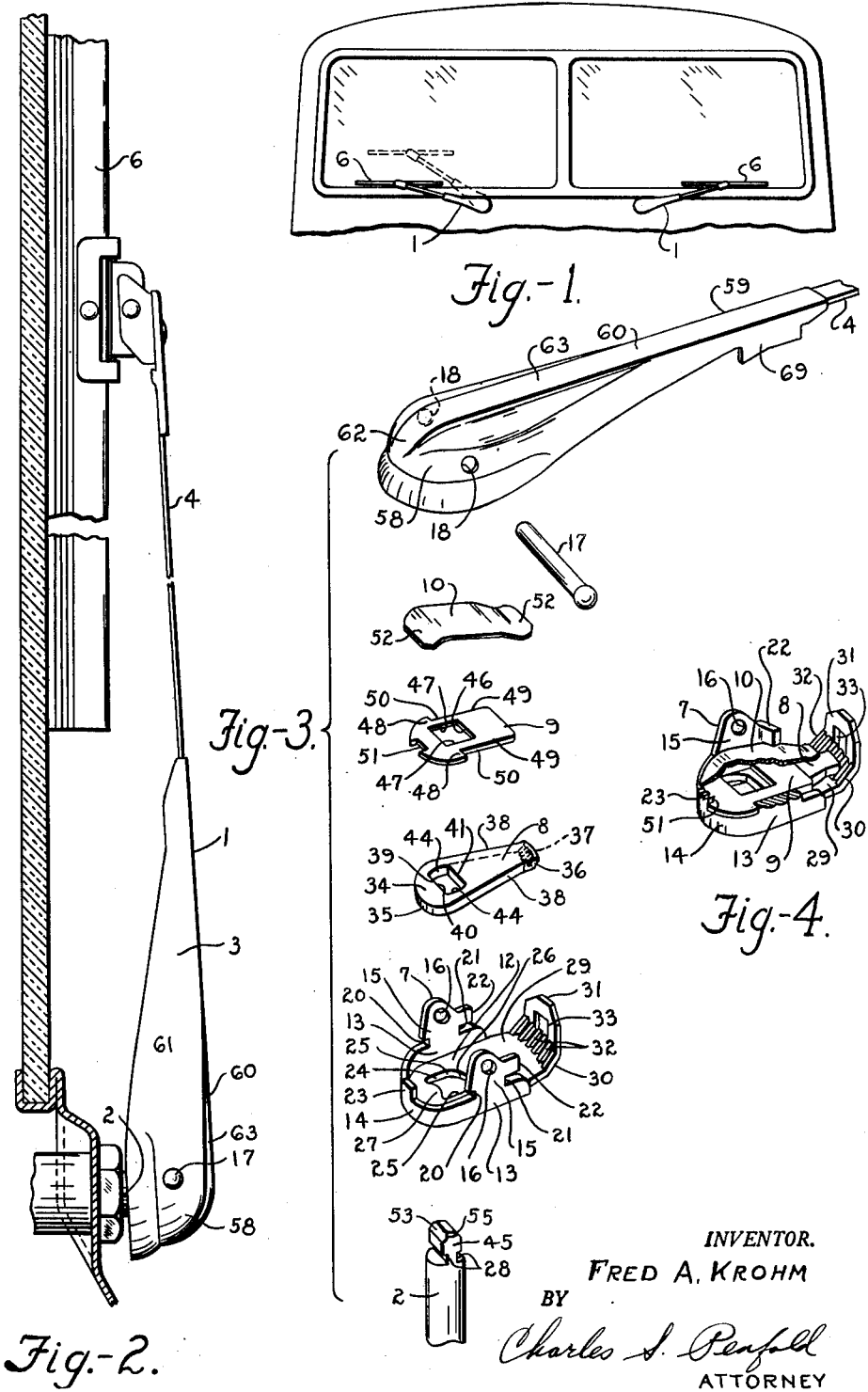
INVENTOR.
FRED A. KROHM
BY
Charles S. Penfold
ATTORNEY

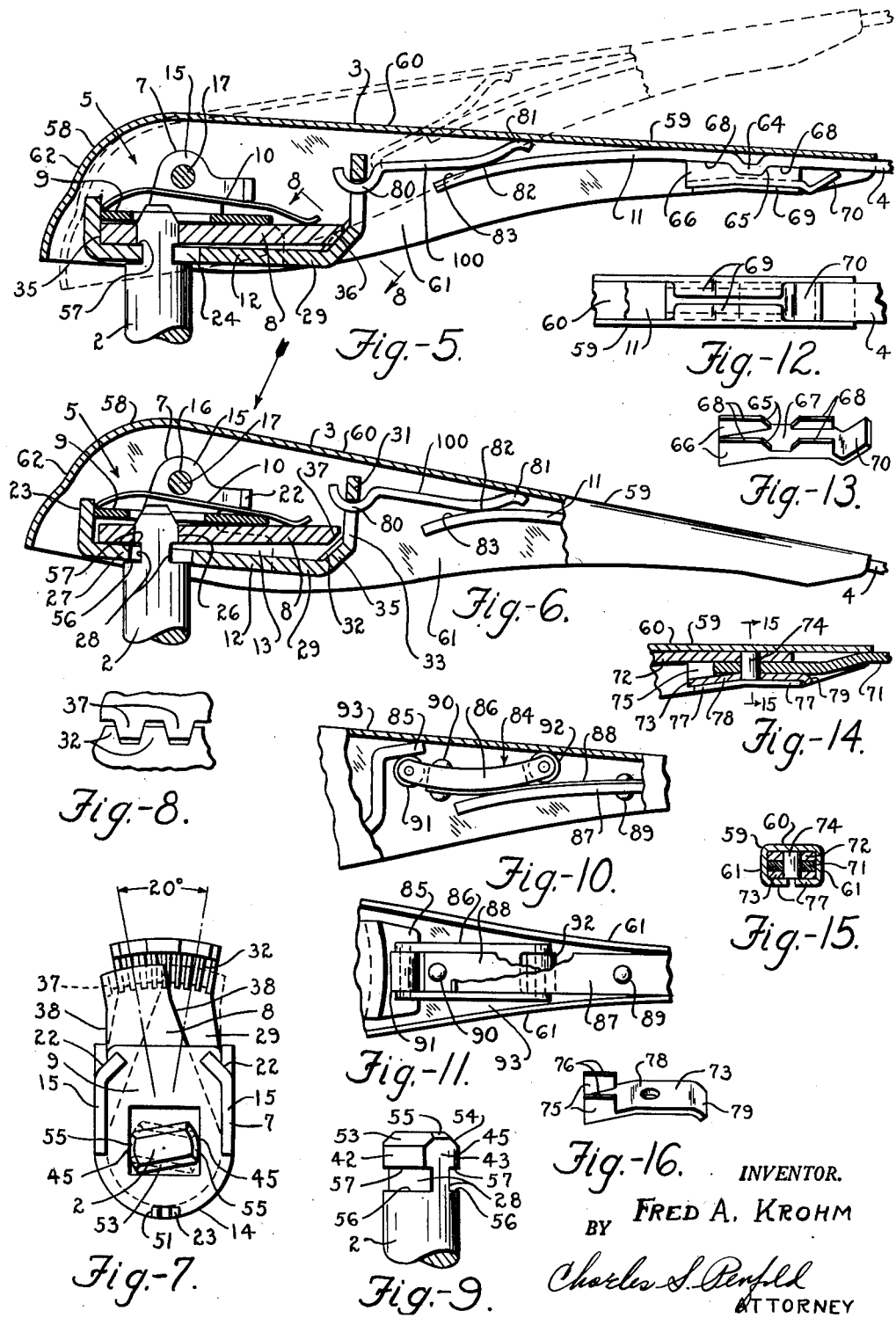

Patented Dec. 30, 1952

2,623,232

UNITED STATES PATENT OFFICE 2,623,232

WINDSHIELD WIPER APPARATUS

Fred A. Krohm, Gary, Ind., assignor to Productive Inventions, Inc., a corporation of Indiana Application May 15, 1946, Serial No. 669,863

13 Claims. (Cl. 15—250)

This invention is related to windshield cleaners and more particularly is directed to improved means for coupling or connecting the means supporting the cleaner or wiper to driving means, such as an oscillating or rotatable shaft.

In modern automotive construction and design the shaft of the motor or other driving mechanism for the cleaner preferably projects or extends in an appropriate direction with respect to the windshield and the wiper arm carrying the wiper or cleaner is preferably connected or assembled to the free extremity of the shaft. In mass production it is not always possible to predetermine or locate the shaft in the exact position, particularly in its proper rotative position according to specifications. This inability to predetermine the proper rotative position of the shaft is a distinct disadvantage due to the fact that when the wiper arm is connected thereto, it will not assume the position intended or desired, and as a consequence the wiper or cleaning means will not wipe or clean the area of the windshield required and the wiper will not return to its proper inoperative generally parallel position with respect to a part of the windshield frame or body of the vehicle.

Automobile manufacturers have found objectionable windshield wiper arm models for original equipment which require for installation the use of tools such as wrenches or screw drivers. The employment of such tools has been found to prolong the time and increase the labor cost involved in making such installation on the assembly line at the factory. The careless use of such tools also causes accidental abrading contact of the tools with the external finish of the automobile with the result that the particular vehicle so defaced must be set aside for refinishing, which causes delays and added costs.

Automobile manufacturers have further found objectionable certain types of arms which, while requiring no tools for installation, must be removed from the shaft and reset when the prior guess at what would be the proper installation to provide the desired position of the wiper blade with relation to the windshield frame, has been incorrect. Often this resetting operation is omitted, with the result that the vehicle reaches the user with the area of contact of the wiper blade in an awkward position with relation to the windshield frame and the line of vision of the driver. Forced to deal with the human element in such installation the automobile manufacturer finds desirable a windshield wiper arm which embodies installation characteristics avoiding the difficulties above recited. The subject invention, it will be noted, requires but two motions of one hand of the employee making the installation and thus reduces the time required for the installation and increases the chance that the wiped area will be properly positioned with relation to the windshield. The installation of the subject arm, in fact, may be made as readily by a one-armed war veteran as otherwise. It thus permits the employment of disabled veterans as effectively as any other person.

The first motion is the simple motion of pressing the arm into position to snap on, or lock on, the shaft. The second motion is a simple motion of adjusting the arm radially to a predetermined position.

Since no tools are used and since there are no separate parts such as nuts or screws employed, any of which when inadvertently dropped mar the surface finish of the automobile, there is no loss of time and no added cost for refinishing. It is also obvious that it is never necessary to first remove the arm and reset it, which fact reduces the time required for installation of the subject invention.

The advantages above described and which accrue in original equipment installation are likewise advantages accruing to the service operator who replaces the original equipment arm, perhaps on a busy gasoline service station drive, where most such replacements are made and where time saved in such replacement operations is important.

Moreover, it will be noted that the absence of projections incidental to the employment of fastening means such as nuts and screws and exposed hinges makes it easier to clean the surface of the subject arm after it has become discolored from use. The objectionable features of arms currently used for original equipment by automobile manufacturers have prevailed throughout the entire industry for many years. Engineers for automobile manufacturers and other engineers familiar with the industry have endeavored over a very long period to devise inventions by which those objectionable features could be completely eliminated in a single model of arm. Not only the inventor herein but inventive engineers and others associated with the inventor have addressed themselves to these problems over a long period of time and have developed, made, and tested many different models of arms and couplings in an effort to achieve the results now finally obtained in the subject invention.

Different automotive manufacturers as well as each manufacturer offering a number of models of vehicles have also been confronted with the problem of providing a wiper arm assembly in which the contact pressure between the wiper or cleaner and the windshield glass will be substantially the same for all installations. This problem has been brought about by the multitude of body designs, location of the drive shaft, and other factors, so that for example, one angle may be formed between the drive shaft and the arm assembly in one installation, and larger angles in other installations, thereby resulting in a situation whereby the larger the angle or divergence between the shaft and arm, the greater the contact pressure will be between the wiper and glass. As a consequence, the wiper will operate satisfactorily in one installation but not in another. Heretofore, manual means, as exemplified in United States Letters Patent No. 2,326,402 dated August 10, 1943, entitled Windshield Wiper Arm, have been employed for the purpose of adjusting or regulating the pressure desired, by controlling the tension of the resilient means associated with the arm. Although the structure of the patent has proven satisfactory in operation and successful commercially, it is difficult to accurately predetermine the amount of pressure required in all installations. Moreover, such structure is not in all respects suitable for cleaning a curved windshield where the arm may assume a plurality of angular positions relative to the shaft axis.

Accordingly, one of the important objects of the present invention is to provide equalizing means whereby the amount of contact pressure between the wiper and glass will obtain or be substantially the same, within practicable limits, for all installations.

Another important object of the invention is to provide improved coupling means whereby the arm may be easily and quickly connected or disconnected with respect to the shaft and while connected may be adjusted to the desired rotative or pivotal position with respect to the shaft to overcome or offset the disadvantages alluded to above. More specifically, it might be stated without limitation, that the invention is directed to a construction embodying means connectable to shaft means for supporting windshield cleaner arm means, the connectable means including a part adapted to engage the shaft means in a manner for movement therewith and a member movably mounted with respect to the part, the member being provided with cooperating means and means to which an element of the arm means may be connected, and the said part being provided with means engageable with the cooperating means in a manner whereby the relative rotative position of the member with respect to the part may be selectively determined as desired.

Another object is to provide coupling means which may be employed in conjunction with means other than a wiper arm for connecting the means to a shaft.

A still further object is to provide an arrangement in which the arm means and coupling means are operatively connected together and influenced by flexible or resilient means in a manner whereby to obtain the desired linkage leverage and motion between the related parts and to urge the cleaner or wiper carried by the arm against the windshield.

Another object is to provide an arm structure that cannot be disconnected from the shaft except by first applying sufficient pressure to the arm in a predetermined direction with respect to the shaft.

A further object is to provide improved means for connecting the flexible means and the inner and outer sections or lengths of the arm means together whereby to substantially secure the means in operative relationship.

An important object is to provide unique methods whereby the various parts of the wiper arm are assembled together and adjusted with respect to the shaft.

Another object is to provide a construction consisting of a minimum number of parts, which may be economically manufactured and assembled on a production basis, and when assembled are positive and efficient in action and result.

Other objects and advantages of the invention will also become apparent after considering the description hereafter set forth in conjunction with the drawing annexed hereto.

In the drawing wherein the preferred structures to which the invention is susceptible are illustrated:

Figure 1 is a front plan view in elevation depicting the application of the invention with respect to a windshield;

Figure 2 is a side view in elevation of cleaner or wiper means showing the arm attached to a shaft and the wiper normally engaging a windshield, with various parts in section;

Figure 3 is an exploded view, clearly illustrating the relation of certain elements or parts of the arm structure, including the character of the driving means or shaft;

Figure 4 is a perspective view showing some of the parts illustrated in Figure 3 assembled;

Figure 5 is a side view in elevation of the arm assembly attached to a shaft, with portions in section and portions broken away to better illustrate certain features of the invention;

Figure 6 is a side view similar to Figure 4, illustrating the position certain elements may assume in the act of adjusting the arm means with respect to the shaft;

Figure 7 is a top view depicting certain parts of the means employed for connecting the arm to the shaft, and mode of adjustment;

Figure 8 is a partial transverse enlarged sectional view taken substantially on line 8—8 of Figure 5 illustrating the preferred form of means which may be employed to advantage in positioning and locking the arm in the desired rotative position;

Figure 9 is an enlarged side view of the driving or shaft means;

Figures 10 and 11 are side and bottom views of modified equalizing means which may be employed;

Figure 12 is a bottom view illustrating the means by which the section or parts of the arm and the flexible or resilient means for urging the arm toward the windshield are assembled together;

Figure 13 is a perspective view of one of the elements used for connecting the parts together as depicted in Figure 12;

Figure 14 is a view similar to Figure 12 showing another way in which the resilient means and arm parts may be secured together;

Figure 15 is a transverse section taken substantially on line 15—15 of Figure 14; and Figure 16 is a perspective view of one of the elements of the assembly illustrated in Figure 14.

Considering the characteristics of the invention more in detail, particularly with reference to Figures 1 and 2 of the drawing, there is illustrated a pair of corresponding cleaner or wiper means 1 suitably disposed for cleaning the panes of a vehicle windshield. Insofar as the present invention is concerned it is immaterial whether the driving means or shaft 2 to which the wiper means or arm 1 is connected is located adjacent the bottom of the windshield frame as shown, at the top, between the panes, or adjacent either end of the windshield proper.

The wiper arm, among other things, which will be subsequently described, preferably includes an inner section or extremity 3, in the form of a housing or shroud, and an outer extremity or section 4, in the form of a flexible flat metal strip. The free end of the outer section 4 carries a wiper 6 of any desirable conventional character as shown in Figures 1 and 2.

The connection or coupling means, generally designated 5, among other things, comprises a carriage member 7, a locking element or pawl 8, a thrust collar 9, and resilient means 10, which are preferably associated together in a unique manner to more or less constitute a separate and independently operable sub-assembly or unit, which is adapted for detachable snap connection with respect to the driving means or shaft 2. Equalizing means which may be in the form of a lever 100 is operatively associated with the connection means and the inner spring portion or end 11 of the outer section 4 of the arm; all of which will be described more in detail subsequently.

The carriage member 7, is preferably made generally oblong in shape and includes a planar base or bottom wall 12, and corresponding outwardly extending parallel side walls 13 joined by a circular end wall 14. The side walls 13 are provided with corresponding spaced apart standards 15 disposed in the same planes as the side walls. The outer end of each standard is provided with a hole 16 through which a headed pintle or pivot pin 17 projects, the ends of the pin extending into apertures 18 provided therefor in the side walls of the housing 3 whereby to provide a pivotal connection between the arm and the coupling and secure the coupling unit substantially within the confines of the housing. The housing 3 and coupling means 5 are so constructed and arranged that each is adapted to more or less guide the other in movement and counteract thrust and vibration therebetween.

The marginal edges of each standard are preferably interrupted by a pair of oppositely disposed cutouts or notches 20 and 21, the latter resulting in the formation of bendable locking fingers 22 which assist in holding the pawl 8 and resilient means 10 in place, and the circular end wall 14 of the carriage is preferably provided with a lug 23 to assist in holding the thrust collar 9 and means 10 in position, all of which will be described more in detail subsequently.

That portion of the base wall 12 between and bridging the side walls 13 is provided with a centrally disposed oblong opening 24 adapted to receive the end of the shaft 2. This opening is defined by a pair of substantially parallel marginal side edges 25, a circular marginal edge 26 at one end, and a re-entrant or inturned tapered projection 27, adjacent the other end for reception in either of the notches or seats 28 provided in the drive shaft 2 depending on the rotative position of the shaft.

The arrangement is such that the opening 24 axially receives the shaft end in substantially any rotative position within a predetermined range whereby the projection 27 cooperates with one of the notches 28 for holding the carriage and associated structure constituting the coupling means against outward axial displacement with respect to the shaft. More specifically, the projection 27 is so constructed and arranged that a recess is formed adjacent each side of the projection to provide clearances whereby to allow for the rotation of the carriage.

The base or bottom wall 12 of the carriage includes a prolongation projecting an appropriate distance beyond the terminations of the side walls 13 as indicated at 29. This prolongation is preferably provided with a continuation extending in the same general direction as the standards 15 and includes a pair of portions 30 and 31. The portions 30 and 31 are preferably arcuate in cross-section and may be disposed as desired but are preferably angled at 45° and 90° to the plane of the base portion 12, respectively. The inner inclined surface of the portion 30 is preferably provided with a plurality of radially extending teeth 32, preferably formed therein by a swaging operation. The portion or termination 31 is preferably provided with a generally square or rectangular shaped opening 33 which is adapted to slidably receive the inner extremity of the equalizing means 100, as clearly illustrated in Figures 5 and 6.

The locking means or pawl member 8, above referred to, is generally planar in character and nests or fits substantially within the confines of the carriage 7 between the side walls 13, as clearly illustrated in Figures 4 through 7. The pawl is generally spatulate in shape and preferably constructed of steel or other hard desirable material due to the fact that it is subjected to considerable strain when the cleaner is operated. One extremity of the pawl is preferably circular in shape as indicated at 34 so that the round marginal edge 35 normally engages the inner circular surface of the circular end wall 14 of the carriage when the coupling is connected to the shaft, as illustrated in Figure 5. Its opposite and smaller extremity is preferably rounded to conform to the curvature of the portions 30 and 31 of the carriage and beveled as indicated at 36, the bevel being provided with a plurality of teeth 37 which are of a character to intermesh with the teeth 32 on the portion 30 of the carriage in a manner whereby the pawl member and carriage member may be selectively positioned and locked in any one of a plurality of rotative positions with respect to each other within a predetermined range or arc of movement. This invention contemplates the provision of means other than interlocking teeth. For example, roughened surfaces, or a plain frictional contact, may be provided where load conditions permit, or in fact any arrangement to obtain an infinite number of desired locking positions. Any kind of teeth may be employed. The tapering marginal edges 38 of the pawl are of a character whereby to engage the side walls 13 of the carriage for limiting or defining the range of movement of the pawl with respect to the carriage or the carriage with respect to the pawl and shaft. Any suitable range of movement between the carriage and pawl may be provided but tests have proven that a rotative range of approximately 20°, as illustrated in Figure 7, is sufficient to allow or permit the arm to be desirably connected and shifted with respect to the shaft to compensate for the various inaccurate preset rotative positions of the shaft in mass production, as pointed out above. The pawl member is provided with a generally oblong aperture 39 in general alignment with the opening 24 in the carriage and is adapted to receive the shaft 2. This aperture 39 is defined by corresponding parallel marginal edges 40 and 41 which are adapted to engage the corresponding parallel flat portions 42 and 43 of the shaft and round end margins 44 which are adapted to engage the circular portions 45 of the shaft. A close fit or connection between the shaft and pawl is thereby established in order to substantially prevent the pawl from moving transversely or in the same plane that the shaft is positioned. The fit is as close as manufacturing tolerances will permit. During assembly the pawl may be seated in the carriage in any position within the prescribed range.

The thrust collar 9, above referred to, is provided with a generally square or rectangular aperture 46 which receives the shaft in a manner whereby the parallel marginal edges 47 defining a part of the aperture more or less engage the circular portions 45 of the shaft to stabilize and balance the connection between the coupling and shaft, and at the same time assists in holding the pawl to the carriage. It is preferably connected to the carriage by tilting and inserting the same so that the portions 48 and 49, formed by notches 50, will be received in the notches 20 and between the standards 15, of the carriage, respectively, whereupon the collar may be pressed against the edges of the side walls with the notch 51, interrupting the circular end of the collar, receiving the lug 23 on the carriage, the lug being distorted as illustrated in Figures 4 and 7. The collar is thus firmly secured to the carriage and since the portions 48 of the collar are caught in the notches 20 of the standards, the collar is substantially held against axial movement at the desired location when the coupling is being connected to the shaft. The aperture 46 is disposed in general co-axial relation to the opening 24 and aperture 39 in the carriage and pawl and when the carriage is rotated for adjustment with respect to the pawl and shaft the marginal edges 47 may more or less slidably engage the circular portions of the shaft. The collar has proven to be an asset to the coupling means but in certain applications may be omitted without materially affecting the operation of the coupling.

The coupling is thus particularly well-stabilized and well-balanced for the purpose of withstanding excessive loads or undue tortional and other strains placed, in some applications, upon the various parts comprising the coupling.

When the pawl and collar are properly positioned with respect to the carriage, the lug 23 and the fingers 22 may be distorted or turned inwardly whereby to hold the pawl in place as illustrated in Figures 4 through 7.

The resilient means or spring 10, above referred to, is preferably generally rectangular in shape and constructed from relatively thin sheet metal strip stock. The end extremities of the spring are preferably angled as indicated at 52, and the intermediate portion is generally planar in character. The spring may be easily and quickly assembled and locked in place by merely inserting its entrance end between the standards and under the inturned fingers 22 to a predetermined position whereupon the opposite end will be caused to ride over and snap down behind the lug 23 to engage and hold the collar 9 in place. The spring 10 is thus backed against the fingers and placed under tension to cause its entrance end to press the pawl in a direction whereby the corresponding teeth 32 and 37 are normally held in interlocking relation before and after the coupling means is connected to the shaft, as substantially depicted in Figure 5. Attention is directed to the fact that the pawl is preferably of a length whereby when properly seated will assume a generally inclined position so that a good connection is established between the teeth 32 and 37. The spring is so constructed and arranged with respect to the carriage and pawl that it normally urges itself against the lug 23 thereby preventing the spring from moving in an opposite direction where it would interfere with the connection between the flexible means 11 and the carriage. The spring is also arched sufficiently so as not to engage the shaft.

It is to be noted that the shaft 2 is preferably provided with corresponding beveled faces 53 and 54 adjacent the flats 42 and 43, with facets 55 adjacent the circular portions 45 of the shaft whereby to assist in piloting or guiding the coupling onto the shaft, and with abutments or shoulders 56 and 57 formed by the notches or recess 28.

The application of the coupling means to the arm means or structure will now be described more in detail. The housing 3 which constitutes the inner section of the arm includes an enlarged extremity 58 within which the coupling means is pivotally mounted, and a smaller channeled extremity 59 within which is secured the flexible section 4 of the arm structure. The extremities of the housing are flared or merged into each other to present a design substantially simulating an elongated tear drop. The housing includes, among other things, a top wall 60, tapering side walls 61, and a circular end wall 62 more or less corresponding to the curvature of the end wall 14 of the carriage. The extremity 58 may be flared as illustrated. The top wall is provided with a longitudinally extending rib 63 which constitutes a continuation of the channel 59 to present a streamlined effect or appearance. The end of the pivot 17 opposite the headed end is preferably upset or flanged after the coupling is mounted in the housing for locking the coupling in place.

The housing 3 and arm section 4 may be attached together as desired but as herein illustrated in Figures 5, 12 and 13, the arm section 4 is provided with a lateral projection 64 which may be formed by a transverse indentation which nests in notches 65 provided in the side walls 66 of an attaching member 67. The marginal edges 68 of the side walls 66 on the opposite sides of the notches engage section 4 on opposite sides of projection 64 and serve to press the section against the front wall of the channel extremity 59 when the ears or fingers 69 formed on the side walls 61 of the extremity are bent against the bent base wall of the channel member 67. The notches 65 and the projection are preferably sufficiently tapered and the base wall channel member 67 and the ears 69 are bent to an extent whereby to provide a well-balanced and stabilized assembly in which no bolts, screws or rivets are employed. The base wall of the member 67 may be provided with a continuation 70, the extremity of which bears against the section 4 at a point spaced from and in advance of the projection whereby to additionally reinforce the assembly. It will be noted that the parts or portions employed for effecting the connection or assembly are arranged substantially entirely within the confines of the housing, the importance of which is obvious.

The arm section 71 similar to the section 4 but of shorter length may be secured to the channel extremity 59 of the housing 3 by a different mode as illustrated in Figures 14, 15 and 16. In this modified arrangement, the section 71 is disposed between a separate flexible metal strip 72 and an attaching member 73 with the pin 74 extending through suitable holes provided therefor in the strip, section, and member. The inner end of the section 71 may engage a pair of lugs 75 provided on the attaching member 73 and the marginal edges 76 on the lugs engage the flexible strip 72. Ears 77 provided on side walls 61 of the channel extremity 59 are adapted to be bent over and against the base 78 of the member 73, the latter of which is preferably preformed with a slight bend so that the ears 77 will substantially take the shape or configuration of the base thereby providing a rigid connection. The same is true of the ears in the preferred embodiment above referred to. This arrangement together with the provision of a projection 79 adjacent one end of the attaching member 73 for engagement by the ears 77 serve to prevent relative longitudinal movement between the parts. The inner extremity of the arm section 71 is also preferably offset so that a portion of the arm will engage the front wall 60 of the extremity 79 whereby to additionally brace the parts. It is of course to be understood that if found desirable, this modification may be altered so that the flexible strip is interposed between the arm section and the attaching member.

The equalizing means 100 constituting an important component element of the invention will now be described. The equalizing means may be constructed as desired but is preferably made in the form of a lever or link means. One extremity of the lever is formed with an offset semi-circular hook portion 80 which extends through the opening 33 in the upturned end 31 of the coupling in a manner to provide a loose fit or pivotal connection between the coupling and the lever. The other extremity of the lever is formed with a rounded portion 81 which normally bears against the front wall 60 of the housing. The intermediate portion of the lever is preferably provided with a lateral curved portion forming a bearing surface 82. The lever in effect simulates an ogee curve. The flexible means or spring 11, which may also be considered a lever, is preferably laterally curved so as to present a bearing surface 83 which engages the surface 82 whereby to press the portion 81 of the lever against the housing. The coupling and housing in effect provide fulcrums for the lever 100 and the lever a fulcrum for the spring 11.

When the arm is properly connected to the shaft in a normal operating condition, as illustrated by the full lines in Figure 5, the shaft and arm form an acute angle so that the axis of the loop 80 adjacent the point of connection between the lever and coupling 5 for all practical purposes is arranged substantially in alignment with the points of connection or engagement between the lever 100 and spring 11 and between the lever and the housing so as to provide a smooth-acting, well-balanced, and stabilized assembly. Such alignment is particularly advantageous because the lever is then in a position to create a condition which has the effect of prolongating or extending the spring 11 to its most effective length.

As alluded to above, the fit between the lever and the coupling is preferably made quite loose in order to more or less obtain a lost-motion pivotal connection, thereby permitting the lever to automatically adjust itself with respect to the coupling, the spring 11, and the housing so that substantially the same amount of pressure will be maintained between the wiper and the windshield irrespective of the angular position of the arm with respect to the shaft. More specifically in this connection, relative movement between the arm and the shaft or the coupling will cause the lever to slightly shift with respect to the coupling due to the lost-motion connection. It is of course obvious, that the coupling may otherwise be connected to the lever so as to avoid lost-motion therebetween. Although a slight translatory movement may occur between the lever and the housing, the parts are preferably constructed and arranged so that the point of engagement between the rounded portion 81 of the lever is stabilized or maintained at a predetermined location so that a rocking or pivotal motion will more or less occur in preference to a sliding action, and the same is true as between the lever and the spring. Since there are few points of engagement between the various parts and the contact or bearing surfaces formed by the lever and the spring 11 are convex in form, friction is reduced to a minimum. When the arm is oscillated across the windshield its angle relative to the shaft may vary or change depending on the character of the surface to be cleaned. In such event, the fulcrum points will automatically shift and the various contacting surfaces may slightly rock with respect to each other. Any rocking of the surfaces or shifting of the fulcrums will of course be negligible in most installations of the apparatus due to the fact that the conventional windshield is relatively planar in character but when applied to a curved windshield, the rocking and shifting will correspondingly vary or fluctuate.

Accordingly, it should be evident that the lever 100 is so constructed and arranged with respect to the other parts of the arm structure that pressure exerted by the flexible means 11 will be substantially the same irrespective of the angle formed by the arm with respect to the shaft. The invention is particularly advantageous since relatively short flexible means may be employed. The arrangement provides for the use of a single relatively short spring, the length of which may in effect be varied or modified by the influence of the lever. The strain placed on such a spring is thus reduced to a minimum since very little movement of the spring is required to produce the desired pressure between the wiper and windshield to obtain a good wiping action, as compared to an assembly in which the spring is directly connected to the coupling. In some installations a greater or less pressure may be required, and this may be accomplished by merely introducing a different lever in which the bearing or fulcrum portion such as 82 is located closer to or farther away from the point of connection between the lever and the coupling, or by increasing the length of the lever so that the rounded portion such as 81 is located closer to or farther from such point, or by rearranging both of said portions.

A pressure change may also be effected by providing the inner extremity of the spring 11 with a bearing surface which will engage the lever at the appropriate point.

A modified equalizing means illustrated in Figures 10 and 11 of the drawing and designated 84 may also be used in lieu of the equalizing means 100 described above. In this modification, the coupling may be provided with a forwardly extending continuation forming a bearing surface 85. A curved lever 86 is secured to a spring 87 by a relatively thin flexible member 88. One end of the flexible member 88 is preferably secured to the spring 87 by a rivet 89 a predetermined distance from the inner end of the spring and its other end is secured to one extremity of the lever by a rivet 90. The extremities of the lever are bifurcated and rotatably receive rollers 91 and 92. The roller 91 normally engages the bearing surface 85 on the coupling and the roller 92 is adapted to rollingly engage the bottom wall of the housing 93. When the arm is moved outwardly from the position illustrated in Figure 10, the lever will more or less move in a counterclockwise direction bending the member 88 and the rollers 91 and 92 will move in a direction toward the coupling. This arrangement substantially eliminates all friction between the lever and the spring 87 and friction between the lever and the coupling and the housing is also alleviated to a considerable degree by the provision of the rollers and by the omission of a tied connection between the lever and the coupling as exemplified in the preferred construction. The fulcrum points and bearing surfaces of this modification may be otherwise disposed as suggested as in the preferred construction to obtain the results desired.

It is of course to be understood that the flexible means which acts upon either of the types of levers above referred to may take the form of any of the springs 11, 12, and 87, and in fact may be otherwise constructed without departing from the spirit of the invention.

In view of the foregoing description, it will be manifest that the complete arm structure is adapted for quick detachable connection to shaft 2 by merely grasping the arm with one hand and directing it so that the beveled face portions 53 and 54 of the shaft will first be engaged by the re-entrant projection 27 of the carriage and the marginal edge 41 of the aperture 39 of the pawl. Further movement of the arm generally axially toward the shaft will cause the projection 27 to ride over the flat portion 42 and engage the abutment or shoulder 56 on the shaft, whereupon the projection will snap into one of the notches or seats 28 between the abutments 56 and 57 to lock the coupling means to the shaft, the parts thereupon assuming the positions as illustrated in Figure 5. When thus connected, the marginal side edges 40 and 41 and curved end margins 44 defining the aperture 39 in the pawl will be caused to more or less engage the flats 42 and 43 and circular portions 45 of the shaft, respectively. The inner parallel marginal edges 46 of the collar and the marginal edges 25 defining the opening 24 in the carriage will also be directed to engage the said circular portions of the shaft to assist in effecting a stabilized connection which substantially avoids thrust and prevents vibration between the various parts.

To adjust the arm while locked to the shaft, it is merely necessary to grasp the arm with one hand and apply sufficient force or pressure in the proper direction to cam and shift the carriage with respect to the pawl to disengage the teeth, whereupon the arm may be easily rotated in a plane generally parallel to the pawl to substantially any desired position within the prescribed range of 20 degrees to locate the arm in the proper rotative radial position with respect to the shaft and to a certain portion of the frame of the windshield, as depicted in Figures 1, 4, 5, and 6. Removal of the pressure will cause the spring 10 which has been placed under tension, to automatically shift the carriage back to its original position so that the teeth will again become engaged to lock the parts together. In this connection, it should be noted that various parts of the coupling means once assume, under the influence of spring 10, their normal locked position with relation to each other, and the coupling is normally secured to the shaft. The spring 11 performs its function which is to urge the arm and wiper toward the windshield and either of the equalizing means may serve to influence the action of the spring so that substantially the same amount of pressure will obtain irrespective of relative movement between the coupling and housing parts of the arm structure. Spring 11 does not oppose, impair, or influence significantly the effect of the resilient means 10 with respect to holding the teeth 32 and 37 in engagement and in locking the coupling to the shaft. The fact that the coupling may be readily secured to or removed from the shaft in the manner described and in any rotative position within the range referred to, is important from the standpoint of facilitating rapid assembly at low cost, on the production line in service replacements. More specifically, the recess or clearance space on either side of the projection 27 allows the carriage, after being connected to the shaft, to be rotated for adjustment, the range or extent of rotation preferably being equal to or greater than that permitted between the carriage and pawl.

The arrangement is such that pressure may be applied at substantially any point along the top wall of the housing or at any frontal point along the housing 3 or outer arm section 4 to effect a camming between the carriage and pawl to disengage the teeth or to unlock the coupling from the shaft. More specifically, pressure may be applied substantially in an angular direction with respect to the shaft, as indicated by the arrow above the housing in Figure 6, or by first pressing the arm toward the shaft in a substantial axial direction and then altering the pressure by forcing the arm in a generally transverse direction toward the shaft. In other words, a minimum amount of pressure in a general axial direction will allow the arm to be easily rotated for adjustment and additional pressure will effect a release of the projection 27 from the seat 28 whereupon the arm may be disconnected from the shaft, in which process the pawl 8 and the carriage 7 move lengthwise with respect to each other and assume substantially the positions shown in Figure 6.

Accordingly, it will be apparent that the improved coupling means provides for a quick detachable snap connection which is positive and efficient in action and result.

It will also be manifest that the coupling means is of such a character that it may be connected and disconnected with respect to the shaft irrespective of its association with a wiper arm. In other words, the coupling may be operatively related to a variety of structures.

Furthermore, it will be apparent that improved means have been provided whereby the arm may be rotated and adjusted to a desired position while the coupling remains fastened to the shaft.

Moreover, it will be evident that improved means have been provided whereby to assemble the sections of the arm and spring 11 together.

Having thus described my invention, it is to be distinctly understood that although preferred embodiments or modifications of the invention have been illustrated and described, the invention is susceptible to other arrangements within the scope of the claims whereby to attain the objects set forth at the beginning of this specification.

I claim:

1. Windshield wiper apparatus comprising a shaft, an arm provided with means to which a wiper blade can be connected, clamping means connecting the arm to said shaft, said clamping means being provided with resilient means actable on said clamping means to normally press at least a portion of said clamping means against the shaft to lock the clamping means to the shaft, flexible means carried by said arm for pressing the arm toward a surface to be cleaned, and means providing an operative connection between said flexible means and said clamping means permitting relative movement therebetween in a manner whereby the pressure exertable by said flexible means will remain substantially constant irrespective of any operative angular relationship between the arm and shaft.

2. A windshield wiper arm, means for connecting the windshield wiper arm to a driving means, said connecting means including a part adapted for non-rotative movement with respect to the driving means, means movably carried by the arm cooperable with said part whereby said arm may be selectively adjusted to different rotative positions with respect to the part, flexible means carried by the arm for urging the arm toward a windshield, and means connected to the movable means and interposed between and engaging the arm and flexible means in a manner whereby to permit relative movement therebetween so that the pressure exertable by the flexible means will remain substantially constant irrespective of any operative relationship between the movable means and the arm.

3. A windshield wiper arm, connecting means on the arm whereby the arm may be attached to a shaft, resilient means on the arm for urging the arm toward a windshield, and means on the arm operatively engaging said resilient means and said connecting means and adapted for relative movement therebetween for automatically influencing the action of said resilient means in a manner whereby the force exerted by said resilient means remains substantially constant irrespective of any operative position that the arm may assume when connected to a shaft.

4. A windshield wiper arm having an inner section and an outer section, means on said inner section for connecting the arm to a shaft, a leaf spring carried by the outer arm section, and lever means supported on said arm, on said inner section and on said leaf spring providing a slidable connection between said inner section and said leaf spring.

5. A windshield wiper arm, means for connecting the arm to a shaft, a leaf spring carried by the arm for urging the arm toward a windshield, and means attached to said connecting means finding support on said leaf spring and interposed therebetween for movement relative to the connecting means for maintaining substantially constant the pressure produced by the leaf spring.

6. A windshield wiper arm comprising an inner arm section and an outer section, means pivotally mounted on the inner section for connecting the arm to operating means, means on the outer section for supporting a wiper, a leaf spring secured to the arm adjacent the junction between the sections and provided with a portion disposed adjacent to said connecting means, and movable means bearing against said connecting means, said leaf spring, and said inner section to permit relative movement between the connecting means and movable means as described.

7. A windshield wiper arm including an inner portion, means mounted on the inner portion for connecting the arm to operating means, link means bearing on the inner portion and on the connecting means, and resilient means carried by the arm and slidably engaging the link means for urging the arm toward a windshield and controlling the amount of pressure produced by the resilient means.

8. A windshield wiper arm including an inner member, a locking member mounted on the inner member for connecting the arm to operating means, resilient means extending from one of the members, and movable lever means interposed between and bearing against the resilient means and other member to permit a loss in motion to occur between the lever means and resilient means in a manner whereby the pressure exertable by the resilient means will remain substantially the same irrespective of various relative operative positions between the members.

9. A windshield wiper arm, means pivoted on the arm for locking the arm to operating means and means on the arm for supporting a wiper, resilient means for urging the arm toward a windshield, and a movable lever interposed between and bearing on the locking means and resilient means for equalizing the pressure exertable by the resilient means irrespective of any relative operative position between the arm and locking means.

10. A wiper arm including an inner housing section movably supporting means for connecting the arm to operating means and an extension for supporting a wiper, a leaf spring carried by the arm and having a portion extending toward but short of said connecting means, and movable means attached to said connecting means and slidably connected to said leaf spring.

11. A wiper arm including an inner section, means movably mounted on said section for connecting the arm to operating means, spring means carried by the arm; and lever means having portions engaging the connecting means, spring means, and said section in a manner whereby the point of engagement between the lever means and spring means will change upon relative movement between said section and said connecting means.

12. A windshield wiper arm, means carried by the arm for locking the arm to a shaft, flexible means on the arm, and means movably supported on the locking means and slidably bearing on said flexible means in a manner whereby the position of the movably supported means will change when the arm is moved relative to the locking means.

13. A windshield wiper arm comprising an inner section, a wiper carrying section connected to the inner section for movement with respect thereto, means carried by the inner section whereby the inner section can be locked to driving means, biasing means on the wiper carrying section of the arm, and means operatively related to the inner section and biasing means and co-acting therewith whereby to influence the relative movement between the arm sections.

FRED A KROHM.

REFERENCES CITED

The following references are of record in the file of this patent:

UNITED STATES PATENTS

| Number | Name | Date |
|---|---|---|
| 1,371,363 | Gillet | Mar. 15, 1921 |
| 1,636,629 | Sayre | May 3, 1927 |
| 2,043,218 | Anderson | June 9, 1936 |
| 2,087,178 | Zaiger | July 13, 1937 |
| 2,161,965 | Liner | June 13, 1939 |
| 2,250,331 | Horton | July 22, 1941 |
| 2,269,623 | Ehrlich | Jan. 13, 1942 |
| 2,365,251 | Curtiss | Dec. 19, 1944 |